United States Patent
Xu et al.

(10) Patent No.: US 10,440,690 B2
(45) Date of Patent: Oct. 8, 2019

(54) REPORTING METHOD OF TERMINAL BUFFER STATE REPORT (BSR), OBTAINING METHOD FOR OBTAINING BSR FROM BASE STATION, AND CORRESPONDING TERMINAL, BASE STATION, COMMUNICATION SYSTEM

(71) Applicant: FUJITSU LIMITED, Kawasaki-shi, Kanagawa (JP)

(72) Inventors: Haibo Xu, Beijing (CN); Yoshiaki Ohta, Kanagawa (JP); Katsumasa Sugiyama, Kanagawa (JP); Paul Bucknell, Brighton (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/654,216

(22) Filed: Jul. 19, 2017

(65) Prior Publication Data
US 2017/0318572 A1    Nov. 2, 2017

Related U.S. Application Data

(63) Continuation of application No. 13/712,265, filed on Dec. 12, 2012, now Pat. No. 9,756,614, which is a
(Continued)

(51) Int. Cl.
*H04W 28/02* (2009.01)
*H04W 72/04* (2009.01)
*H04W 28/12* (2009.01)

(52) U.S. Cl.
CPC ... *H04W 72/0406* (2013.01); *H04W 28/0278* (2013.01); *H04W 28/12* (2013.01)

(58) Field of Classification Search
CPC . H04W 28/0278; H04W 28/12; H04W 72/04; H04W 72/12; H04W 72/0406; H04W 72/1284
See application file for complete search history.

(56) References Cited

U.S. PATENT DOCUMENTS 8,873,475 B2   10/2014  Ono
9,042,320 B2   5/2015   Kim et al.
(Continued)

FOREIGN PATENT DOCUMENTS

CN   101426270 A   5/2009
CN   101516104 A   8/2009
(Continued)

OTHER PUBLICATIONS

Pretrial Report issued for corresponding Japanese Patent Application No. 2013-514523, dated Sep. 1, 2014, with an English translation.
(Continued)

*Primary Examiner* — Mohamed A Kamara
(74) *Attorney, Agent, or Firm* — Myers Wolin, LLC

(57) ABSTRACT

A terminal, includes a buffer status report table; at least another table for extended buffer status report; a receiver looks for an indication in a signaling received from a base station wherein the indication corresponds to a type of buffer status report table and selects a table from among the buffer status report table and the at least another table for extended buffer status report based on the indication corresponding to the type of buffer status report table, wherein the indication corresponding to the type of buffer status report table can be determined according to a type of the terminal; and an index sender sends the index to a base station an index obtained from the selected table according to an amount of data in a buffer of the terminal.

9 Claims, 9 Drawing Sheets

Related U.S. Application Data continuation of application No. PCT/CN2010/074076, filed on Jun. 18, 2010.

(56) References Cited

U.S. PATENT DOCUMENTS

| | | | | |
|---|---|---|---|---|
| 9,756,614 | B2* | 9/2017 | Xu | H04W 28/12 |
| 2009/0125650 | A1 | 5/2009 | Sebire | |
| 2009/0149189 | A1 | 6/2009 | Sammour et al. | |
| 2009/0219951 | A1 | 9/2009 | Chun et al. | |
| 2009/0285104 | A1 | 11/2009 | Tseng | |
| 2010/0070814 | A1 | 3/2010 | Damnjanovic et al. | |
| 2010/0124237 | A1 | 5/2010 | Chun et al. | |
| 2010/0135166 | A1 | 6/2010 | Ahluwalia | |
| 2010/0165933 | A1 | 7/2010 | Fukui et al. | |
| 2010/0226325 | A1 | 9/2010 | Chun et al. | |
| 2011/0242972 | A1* | 10/2011 | Sebire | H04L 67/06 |
| | | | | 370/229 |
| 2011/0292873 | A1 | 12/2011 | Guo | |
| 2012/0070814 | A1 | 3/2012 | Iida et al. | |
| 2013/0028223 | A1* | 1/2013 | Kim | H04L 5/0007 |
| | | | | 370/329 |

FOREIGN PATENT DOCUMENTS

| | | |
|---|---|---|
| CN | 101562894 | 10/2009 |
| CN | 101682922 A | 3/2010 |
| CN | 102907161 A | 1/2013 |
| EP | 2 145 436 | 1/2010 |
| JP | 2009-284479 A | 12/2009 |
| JP | 2010-114681 A | 5/2010 |
| JP | 2011-250408 A | 12/2011 |
| JP | 2013-524605 A | 6/2013 |
| JP | 2013-524680 A | 6/2013 |
| RU | 2008124979 A | 12/2009 |
| WO | 2007/078142 A1 | 7/2007 |
| WO | 2008/041417 A1 | 4/2008 |
| WO | 2009038377 | 3/2009 |
| WO | 2009/054655 A2 | 4/2009 |
| WO | 2009/086696 A1 | 7/2009 |
| WO | 2011/121112 A1 | 10/2011 |
| WO | 2011/126311 A2 | 10/2011 |

OTHER PUBLICATIONS

Notice of Final Rejection issued for corresponding Korean Patent Application No. 10-2012-7033142 dated Dec. 16, 2014 with an English translation.
Office Action issued for corresponding Mexican Patent Application No. MX/a/2013/007939, dated May 22, 2014, with an English translation.
Office Action issued for corresponding Korean Patent Application No. 10-2012-7033142, dated May 27, 2014, with an English translation.
Final Office Action issued for corresponding Japanese Patent Application No. 2013-514523, dated Apr. 15, 2014, with an English translation.
Notice of Preliminary Rejection issued for corresponding Korean Patent Application No. 10-2012-7033142 dated Apr. 13, 2015 with an English translation.
Notice of Official Action by the Russian Intellectual Property Patent Office for corresponding Russian Patent Application No. 2013102260/08(003008) dated Jun. 27, 2014 with English Translation.
A First Office Action issued by the Canadian Intellectual Property Office for corresponding Canadian Patent Application No. 2,802,437 dated Aug. 4, 2014.
Office Action issued for corresponding Canadian Patent Application No. 2,802,437 dated Aug. 4, 2015.
Communication of the substantive examination issued for corresponding Mexican Patent Application No. MX/a/2015/000936 dated Jun. 23, 2015 with an English translation.

Office Action issued for corresponding Mexican Patent Application No. MX/a/2013/007939, dated Dec. 5, 2013, with an English translation.
Decision on Grant (Notice of Allowance) issued by the Russian Patent Office for corresponding Russian patent application No. 2013102260/08(003008) dated Oct. 10, 2014.
Pre-Appeal Review issued by the Japan Patent Office for corresponding Japanese Patent Application No. 2014-144529, dated Aug. 30, 2016, with an English translation.
Ericsson et al., "Buffer Size Levels for BSR in E-UTRA Uplink", Agenda Item: 6.1.1.5, 3GPP TSG-RAN WG2 Meeting #62bis, R2-083101, Warsaw, Poland, Jun. 30-Jul. 4, 2008.
Notice of Reason for Refusal issued for corresponding Japanese Patent Application No. 2013-514523, dated Jan. 21, 2014, with an English translation.
Nokia Siemens Networks et al., "BSR for Carrier Aggregation", Agenda Item: 7.1.9, May 10-14, 2010, R2-102805, 3GPP TSG-RAN WG2 Meeting #70, Montreal, Canada.
Samsung, "On BSR for REL-10", Agenda Item: 7.1.2, Apr. 12-16, 2010, R2-102459, 3GPP TSG-RAN2 #69bis meeting, Beijing, China.
The extended European search report with the supplementary European search report and the European search opinion issued for corresponding European Patent Application No. 10853083.3, dated Jan. 2, 2014.
Samsung; "REL-10 BSR format and buffer size field"; Agenda Item: 7.1.9; 3GPP TSG-RAN #70 Meeting; Tdoc R2-102987; Montreal, Canada; May 10-14, 2010.
International Search Report issued for corresponding International Patent Application No. PCT/CN2010/074076 dated Mar. 24, 2011 with English translation.
Office Action issued by the Japan Patent Office for corresponding Japanese Patent Application No. 2014-144529, dated Sep. 1, 2015, with an English translation.
Ericsson et al., "Details of BSR Reporting", Agenda Item: 7.1.9, 3GPP TSG-RAN WG2 Meeting #70, R2-102959, Montreal, Canada, May 10-14, 2010.
Non-Final Office Action issued by the United States Patent and Trademark Office for corresponding U.S. Appl. No. 13/712,265, electronically delivered on Jul. 14, 2015.
Final Office Action issued by the United States Patent and Trademark Office for corresponding U.S. Appl. No. 13/712,265, electronically delivered on Mar. 29, 2016.
Final Office Action issued by the United States Patent and Trademark Office for corresponding U.S. Appl. No. 13/712,265, electronically delivered on Mar. 2, 2015.
Non-Final Office Action issued by the United States Patent and Trademark Office for corresponding U.S. Appl. No. 13/712,265, electronically delivered on Aug. 4, 2014.
Non-Final Office Action issued by the United States Patent and Trademark Office for corresponding U.S. Appl. No. 13/712,265, electronically delivered on Nov. 3, 2016.
First Notification of Office Action issued by the State Intellectual Property Office of China for corresponding Chinese Patent Application No. 201511029937.2, dated Jun. 1, 2018, with an English summary.
3GPP TS 36.321 V8.8.0, "3rd Generation Partnership Project; Technical Specification Group Radio Access Network; Evolved Universal Terrestrial Radio Access (E-UTRA) Medium Access Control (MAC) protocol specification (Release 8)", Dec. 2009.
Alcatel-Lucent Shanghai Bell et al., "BSR reporting in Carrier Aggregation", Agenda Item: 7.1.9, 3GPP TSG-RAN WG2 Meeting #70, R2-103277, Montreal, Canada, May 10-14, 2010.
Summary of Trial Decision issued by the Japan Patent Office for corresponding Japanese Patent Application No. 2014-144529, dated Aug. 29, 2017, with an English translation.
Extended European search report with supplementary European search report and the European search opinion issued by the European Patent Office for corresponding European Patent Application No. 18186852.2, dated Nov. 30, 2018.
3GPP TS 36.321 V9.3.0, "3rd Generation Partnership Project; Technical Specification Group Radio Access Network; Evolved

(56) References Cited

OTHER PUBLICATIONS

Universal Terrestrial Radio Access (E-UTRA); Medium Access Control (MAC) protocol specification (Release 9)", Jun. 2010, pp. 31-34.

Notification of Reasons for Refusal issued by the Japan Patent Office for corresponding Japanese Patent Application No. 2018-047625, dated Jun. 4, 2019, with an English translation.

* cited by examiner

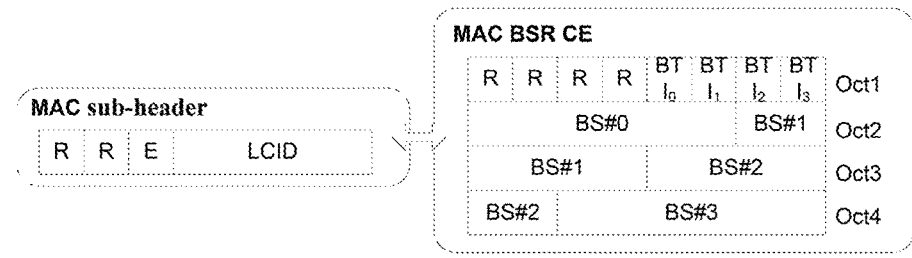
Fig. 7
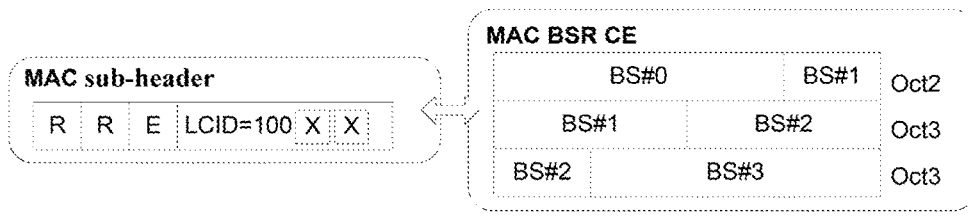
Fig. 8
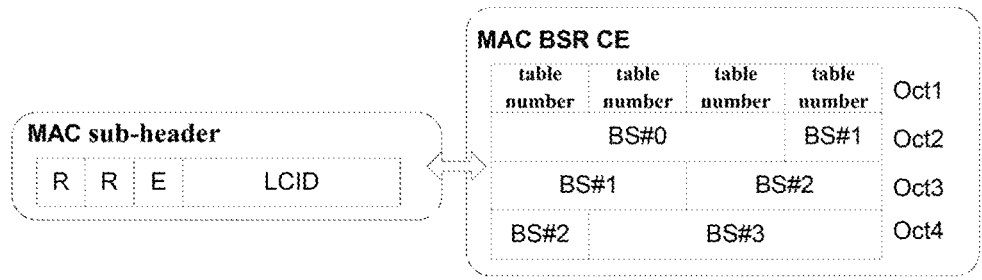
(a)
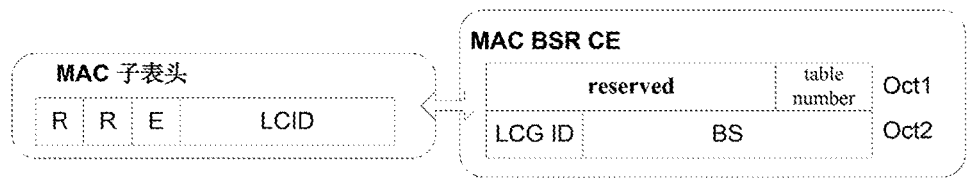
(b)
Fig. 9

| index | data amount in buffer area [byte] | index | data amount in buffer area [byte] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | 34 | 1552 < BS <= 1817 |
| 3 | 12 < BS <= 14 | 35 | 1817 < BS <= 2127 |
| 4 | 14 < BS <= 17 | 36 | 2127 < BS <= 2490 |
| 5 | 17 < BS <= 19 | 37 | 2490 < BS <= 2915 |
| 6 | 19 < BS <= 22 | 38 | 2915 < BS <= 3413 |
| 7 | 22 < BS <= 26 | 39 | 3413 < BS <= 3995 |
| 8 | 26 < BS <= 31 | 40 | 3995 < BS <= 4677 |
| 9 | 31 < BS <= 36 | 41 | 4677 < BS <= 5476 |
| 10 | 36 < BS <= 42 | 42 | 5476 < BS <= 6411 |
| 11 | 42 < BS <= 49 | 43 | 6411 < BS <= 7505 |
| 12 | 49 < BS <= 57 | 44 | 7505 < BS <= 8787 |
| 13 | 57 < BS <= 67 | 45 | 8787 < BS <= 10287 |
| 14 | 67 < BS <= 78 | 46 | 10287 < BS <= 12043 |
| 15 | 78 < BS <= 91 | 47 | 12043 < BS <= 14099 |
| 16 | 91 < BS <= 107 | 48 | 14099 < BS <= 16507 |
| 17 | 107 < BS <= 125 | 49 | 16507 < BS <= 19325 |
| 18 | 125 < BS <= 146 | 50 | 19325 < BS <= 22624 |
| 19 | 146 < BS <= 171 | 51 | 22624 < BS <= 26487 |
| 20 | 171 < BS <= 200 | 52 | 26487 < BS <= 31009 |
| 21 | 200 < BS <= 234 | 53 | 31009 < BS <= 36304 |
| 22 | 234 < BS <= 274 | 54 | 36304 < BS <= 42502 |
| 23 | 274 < BS <= 321 | 55 | 42502 < BS <= 49759 |
| 24 | 321 < BS <= 376 | 56 | 49759 < BS <= 58255 |
| 25 | 376 < BS <= 440 | 57 | 58255 < BS <= 68201 |
| 26 | 440 < BS <= 515 | 58 | 68201 < BS <= 79846 |
| 27 | 515 < BS <= 603 | 59 | 79846 < BS <= 93479 |
| 28 | 603 < BS <= 706 | 60 | 93479 < BS <= 109439 |
| 29 | 706 < BS <= 826 | 61 | 109439 < BS <= 128125 |
| 30 | 826 < BS <= 967 | 62 | 128125 < BS <= 150000 |
| 31 | 967 < BS <=1132 | 63 | BS > 150000 |

Fig. 10

| index | data amount in buffer area [byte] | index | data amount in buffer area [byte] |
|---|---|---|---|
| 0 | BS = 0 | 32 | 3148 < BS ≤ 3813 |
| 1 | 0 < BS ≤ 10 | 33 | 3813 < BS ≤ 4619 |
| 2 | 10 < BS ≤ 13 | 34 | 4619 < BS ≤ 5595 |
| 3 | 13 < BS ≤ 15 | 35 | 5595 < BS ≤ 6777 |
| 4 | 15 < BS ≤ 18 | 36 | 6777 < BS ≤ 8209 |
| 5 | 18 < BS ≤ 22 | 37 | 8209 < BS ≤ 9944 |
| 6 | 22 < BS ≤ 27 | 38 | 9944 < BS ≤ 12046 |
| 7 | 27 < BS ≤ 32 | 39 | 12046 < BS ≤ 14591 |
| 8 | 32 < BS ≤ 39 | 40 | 14591 < BS ≤ 17675 |
| 9 | 39 < BS ≤ 47 | 41 | 17675 < BS ≤ 21410 |
| 10 | 47 < BS ≤ 57 | 42 | 21410 < BS ≤ 25935 |
| 11 | 57 < BS ≤ 69 | 43 | 25935 < BS ≤ 31416 |
| 12 | 69 < BS ≤ 83 | 44 | 31416 < BS ≤ 38055 |
| 13 | 83 < BS ≤ 100 | 45 | 38055 < BS ≤ 46097 |
| 14 | 100 < BS ≤ 121 | 46 | 46097 < BS ≤ 55839 |
| 15 | 121 < BS ≤ 147 | 47 | 55839 < BS ≤ 67640 |
| 16 | 147 < BS ≤ 178 | 48 | 67640 < BS ≤ 81935 |
| 17 | 178 < BS ≤ 215 | 49 | 81935 < BS ≤ 99251 |
| 18 | 215 < BS ≤ 261 | 50 | 99251 < BS ≤ 120226 |
| 19 | 261 < BS ≤ 316 | 51 | 120226 < BS ≤ 145635 |
| 20 | 316 < BS ≤ 382 | 52 | 145635 < BS ≤ 176413 |
| 21 | 382 < BS ≤ 463 | 53 | 176413 < BS ≤ 213695 |
| 22 | 463 < BS ≤ 561 | 54 | 213695 < BS ≤ 258857 |
| 23 | 561 < BS ≤ 679 | 55 | 258857 < BS ≤ 313563 |
| 24 | 679 < BS ≤ 823 | 56 | 313563 < BS ≤ 379831 |
| 25 | 823 < BS ≤ 997 | 57 | 379831 < BS ≤ 460103 |
| 26 | 997 < BS ≤ 1207 | 58 | 460103 < BS ≤ 557340 |
| 27 | 1207 < BS ≤ 1462 | 59 | 557340 < BS ≤ 675127 |
| 28 | 1462 < BS ≤ 1771 | 60 | 675127 < BS ≤ 817807 |
| 29 | 1771 < BS ≤ 2146 | 61 | 817807 < BS ≤ 990641 |
| 30 | 2146 < BS ≤ 2599 | 62 | 990641 < BS ≤ 1200000 |
| 31 | 2599 < BS ≤ 3148 | 63 | 1200000 < BS |

Fig. 11

| index | data amount in buffer area [byte] | index | data amount in buffer area [byte] |
|---|---|---|---|
| 0 | 150000<=BS<=155034 | 32 | 431325<BS<=445799 |
| 1 | 155034<BS<=160237 | 33 | 445799<BS<=460759 |
| 2 | 160237<BS<=165614 | 34 | 460759<BS<=476221 |
| 3 | 165614<BS<=171172 | 35 | 476221<BS<=492202 |
| 4 | 171172<BS<=176916 | 36 | 492202<BS<=508719 |
| 5 | 176916<BS<=182853 | 37 | 508719<BS<=525790 |
| 6 | 182853<BS<=188989 | 38 | 525790<BS<=543435 |
| 7 | 188989<BS<=195331 | 39 | 543435<BS<=561671 |
| 8 | 195331<BS<=201886 | 40 | 561671<BS<=580520 |
| 9 | 201886<BS<=208660 | 41 | 580520<BS<=600000 |
| 10 | 208660<BS<=215663 | 42 | 600000<BS<=620135 |
| 11 | 215663<BS<=222900 | 43 | 620135<BS<=640946 |
| 12 | 222900<BS<=230380 | 44 | 640946<BS<=662454 |
| 13 | 230380<BS<=238111 | 45 | 662454<BS<=684685 |
| 14 | 238111<BS<=246101 | 46 | 684685<BS<=707661 |
| 15 | 246101<BS<=254360 | 47 | 707661<BS<=731409 |
| 16 | 254360<BS<=262895 | 48 | 731409<BS<=755953 |
| 17 | 262895<BS<=271718 | 49 | 755953<BS<=781321 |
| 18 | 271718<BS<=280836 | 50 | 781321<BS<=807541 |
| 19 | 280836<BS<=290260 | 51 | 807541<BS<=834640 |
| 20 | 290260<BS<=300000 | 52 | 834640<BS<=862649 |
| 21 | 300000<BS<=310068 | 53 | 862649<BS<=891597 |
| 22 | 310068<BS<=320473 | 54 | 891597<BS<=921517 |
| 23 | 320473<BS<=331227 | 55 | 921517<BS<=952441 |
| 24 | 331227<BS<=342343 | 56 | 952441<BS<=984403 |
| 25 | 342343<BS<=353831 | 57 | 984403<BS<=1017437 |
| 26 | 353831<BS<=365705 | 58 | 1017437<BS<=1051580 |
| 27 | 365705<BS<=377977 | 59 | 1051580<BS<=1086869 |
| 28 | 377977<BS<=390661 | 60 | 1086869<BS<=1123342 |
| 29 | 390661<BS<=403771 | 61 | 1123342<BS<=1161039 |
| 30 | 403771<BS<=417320 | 62 | 1161039<BS<=1200000 |
| 31 | 417320<BS<=431325 | 63 | BS>1200000 |

Fig. 12

| index | data amount in buffer area [byte] | index | data amount in buffer area [byte] |
|---|---|---|---|
| 0 | 150000<=BS<=155584 | 32 | 483090<BS<=501073 |
| 1 | 155584<BS<=161376 | 33 | 501073<BS<=519726 |
| 2 | 161376<BS<=167383 | 34 | 519726<BS<=539073 |
| 3 | 167383<BS<=173614 | 35 | 539073<BS<=559140 |
| 4 | 173614<BS<=180077 | 36 | 559140<BS<=579954 |
| 5 | 180077<BS<=186780 | 37 | 579954<BS<=601542 |
| 6 | 186780<BS<=193733 | 38 | 601542<BS<=623935 |
| 7 | 193733<BS<=200945 | 39 | 623935<BS<=647161 |
| 8 | 200945<BS<=208425 | 40 | 647161<BS<=671251 |
| 9 | 208425<BS<=216183 | 41 | 671251<BS<=696239 |
| 10 | 216183<BS<=224231 | 42 | 696239<BS<=722156 |
| 11 | 224231<BS<=232578 | 43 | 722156<BS<=749039 |
| 12 | 232578<BS<=241236 | 44 | 749039<BS<=776922 |
| 13 | 241236<BS<=250216 | 45 | 776922<BS<=805843 |
| 14 | 250216<BS<=259530 | 46 | 805843<BS<=835840 |
| 15 | 259530<BS<=269191 | 47 | 835840<BS<=866954 |
| 16 | 269191<BS<=279212 | 48 | 866954<BS<=899227 |
| 17 | 279212<BS<=289605 | 49 | 899227<BS<=932701 |
| 18 | 289605<BS<=300386 | 50 | 932701<BS<=967421 |
| 19 | 300386<BS<=311568 | 51 | 967421<BS<=1003433 |
| 20 | 311568<BS<=323166 | 52 | 1003433<BS<=1040786 |
| 21 | 323166<BS<=335196 | 53 | 1040786<BS<=1079529 |
| 22 | 335196<BS<=347673 | 54 | 1079529<BS<=1119715 |
| 23 | 347673<BS<=360615 | 55 | 1119715<BS<=1161396 |
| 24 | 360615<BS<=374039 | 56 | 1161396<BS<=1204629 |
| 25 | 374039<BS<=387963 | 57 | 1204629<BS<=1249471 |
| 26 | 387963<BS<=402405 | 58 | 1249471<BS<=1295983 |
| 27 | 402405<BS<=417384 | 59 | 1295983<BS<=1344226 |
| 28 | 417384<BS<=432922 | 60 | 1344226<BS<=1394265 |
| 29 | 432922<BS<=449037 | 61 | 1394265<BS<=1446167 |
| 30 | 449037<BS<=465753 | 62 | 1446167<BS<=1500000 |
| 31 | 465753<BS<=483090 | 63 | BS>1500000 |

REPORTING METHOD OF TERMINAL BUFFER STATE REPORT (BSR), OBTAINING METHOD FOR OBTAINING BSR FROM BASE STATION, AND CORRESPONDING TERMINAL, BASE STATION, COMMUNICATION SYSTEM

CROSS-REFERENCE TO RELATED APPLICATIONS

The present application is a continuation of U.S. application Ser. No. 13/712,265, filed Dec. 12, 2012, which is a continuation of PCT Application No. PCT/CN2010/074076, filed on Jun. 18, 2010, the contents of each are herein wholly incorporated by reference.

FIELD OF THE INVENTION

The present invention relates to the field of communication, and in particular to a Buffer Status Report (BSR) method of a terminal, a BSR obtaining method at a base station, and a terminal, a base station and a communication system related thereto.

BACKGROUND OF THE INVENTION

In the Long Term Evolution (LTE) project of the Universal Mobile Telecommunication System (UMTS) technique, it is necessary for a terminal to report some uplink scheduling information to a base station, such as a buffer status report of the terminal, i.e. the so-called BSR, in order to assist the base station in scheduling the resources more effectively.

In the LTE system, the BSR is used to represent the data amount in the buffer of the terminal which is permitted. According to the specification of the LTE project, the maximum buffer data amount supported by the terminal is 150 K. Furthermore, in the LTE system, there are generally three types of BSR: a long BSR, a short BSR, and a shorten BSR. The long BSR may report the buffer status of four logic channel groups.

To transmit the BSR between the base station and the terminal, a BSR table is provided in both the base station and the terminal. In the BSR table, an interval between 0 and 150 K is divided into a plurality of small intervals according to the method of the technical document 1 (3GPP RAN2 document, R2-083101, "Buffer Size Levels for BSR in E-UTRA Uplink"), with the index number of each small interval corresponding to a range of the size of the data amount in the buffer. The content of the technical document 1 is incorporated herein by reference in its entirety. Therefore, the terminal and the base station may report and receive the range of the size of the data amount in the buffer (i.e. the BSR) by transmitting the index number.

Specifically, the terminal finds out the index number in the BSR table according to the size of the data amount in the buffer thereof and reports this index number to the base station, and then the base station obtains the range of the size of the data amount in the buffer (i.e. the BSR) from the BSR table according to the index number.

In the LTE project, codes of 6 bites are defined for reporting the above index number. In this case, the interval between 0 and 150 K may therefore be divided into 64 small intervals according to the method of the technical document 1. The corresponding relation between the index numbers of respective small intervals and the ranges of the sizes of the data amounts in the corresponding buffers is stored to form the BSR table.

FIG. 10 shows an example of a BSR table in the existing LTE system. It can be seen that, this BSR table indicates only that the present data amount is over 150 K but may not give a more specific numerical value or a numerical value range, when the maximum buffer data amount in the buffer is over 150 K.

With the freezing of the LTE project, the study on the fourth generation mobile communication system (LTE-Advanced, LTE-A) technique has been initiated presently. In the LTE-A, requirement for higher data speed is put forward, for example downlink 1 Gbps, and uplink 500 MGbps.

With the development of the LTE-A technique and the further increasing in the data speed, the reportable maximum buffer data amount supported by the terminal will be far beyond 150 K, for example go up to 1200 K or 1500 K. Thus, the BSR table in the existing LTE technique is not able to support any more the maximum buffer data amount reportable by the terminal, so that it is necessary to improve the BSR table for adapting to the new maximum buffer data amount.

One solution is to extend the size of the BSR table. For example, codes of 7 bites are adapted to indicate the index number, and in this case, the number of the interval in the BSR table may reach up to 128.

Another solution is to extend the maximum buffer data amount in the BSR table. For example, in the technical solution provided by the technical document 2 (3GPP RAN2 document, R2-102987, "REL-10 BSR format and buffer size field"), the maximum buffer data amount in the existing BSR table is extended directly to 1200 K or 1500 K, and then the range between 0 and 1200 K or between 0 and 1500 K is divided into a plurality of small intervals according to the technical document 1. FIG. 11 shows a BSR table according to the technical solution of the technical document 2, and the maximum buffer data amount is 1200 K in the BSR table shown in FIG. 11. Furthermore, in the technical solution of the technical document 2, the existing BSR table is replaced by the extended BSR table.

SUMMARY OF THE INVENTION

A brief description of the present invention is given hereinafter, so as to provide basic understanding of some aspects of the present invention. It should be understood that this brief description is not the exhaustive description of the present invention. It is not intended to determine the key or important part of the present invention, or to define the scope of the present invention. The purpose of this brief description is only to give some concepts in a simplified form to be used as a preamble of the more detailed description discussed later.

An object of the present invention is to extend the BSR table for adapting to the new maximum buffer data amount (for example, 1200 K or 1500 K, but not limited to this). According to the present invention, at least one extended BSR table is added to the present BSR table. The present invention further provides a BSR reporting method, and a BSR obtaining method in case of adding the extended BSR table, and a base station, a terminal and a communication system related thereto.

According to one aspect of the present invention, a terminal is provided, and the terminal includes a buffer status report table; at least one extended buffer status report table; a table selector, selecting a table from the buffer status report table and the at least one extended buffer status report table; an index determining unit, obtaining an index from the table according to a data amount in a buffer of the terminal; and an index sender, sending the index to the base station.

According to another aspect of the present invention, a buffer status report method of a terminal is provided. The terminal includes a buffer status report table and at least one extended buffer status report table, and the method includes selecting a table from the buffer status report table and the at least one extended buffer status report table; obtaining an index from the table according to a data amount in a buffer of the terminal; and sending the index to the base station.

According to yet another aspect of the present invention, a base station is provided, and the base station includes a buffer status report table; at least one extended buffer status report table; a table selector, selecting a table from the buffer status report table and the at least one extended buffer status report table; an index receiver, receiving an index from a terminal; and a data amount determining unit, determining the data amount in the buffer of the terminal according to the index from the table.

According to further aspect of the present invention, a buffer status report obtaining method at a base station is provided, in which the base station includes a buffer status report table and at least one extended buffer status report table, and the method includes selecting a table from the buffer status report table and the at least one extended buffer status report table; receiving an index from a terminal; and determining the data amount in the buffer of the terminal according to the index from the table.

According to yet further aspect of the present invention, a communication system is provided, and the communication system includes at least one base station described above and at least one terminal described above.

These and other advantages of the present invention will be more obvious according to the detailed description of the optimal embodiments of the present invention in conjunction with the drawings.

BRIEF DESCRIPTION OF THE DRAWINGS

The present invention may be better understood referring to the description given in conjunction with the drawings hereinafter, in which same or similar reference numerals represent same or similar components throughout the drawings. The drawings are contained in this description together with the following detailed explanation to form a part of this description, and are used to further describe the preferred embodiments of the present invention and explain the principles and the advantages of the present invention by way of example. In which:

FIG. 7 is an illustrative diagram of a MAC signaling used in a BSR report method of a terminal and/or a BSR report obtaining method of a base station according to an embodiment of the present invention;

FIG. 8 is an illustrative diagram of a MAC signaling used in a BSR report method of a terminal and/or a BSR report obtaining method of a base station according to an embodiment of the present invention;

FIG. 9 is an illustrative diagram of a MAC signaling used in a BSR report method of a terminal and/or a BSR report obtaining method of a base station according to an embodiment of the present invention;

FIG. 10 is an example of a existing BSR table;

FIG. 11 shows a BSR table according to a technical document 2, in which the maximum buffer data amount is 1200 K;

FIG. 12 shows an extended BSR table according to an embodiment of the present invention, in which a range of buffer data amount is from 150 K to 1200 K;

FIG. 13 shows an extended BSR table according to an embodiment of the present invention, in which a range of buffer data amount is from 150 K to 1500 K.

DETAILED DESCRIPTION OF THE INVENTION

Figure 1:
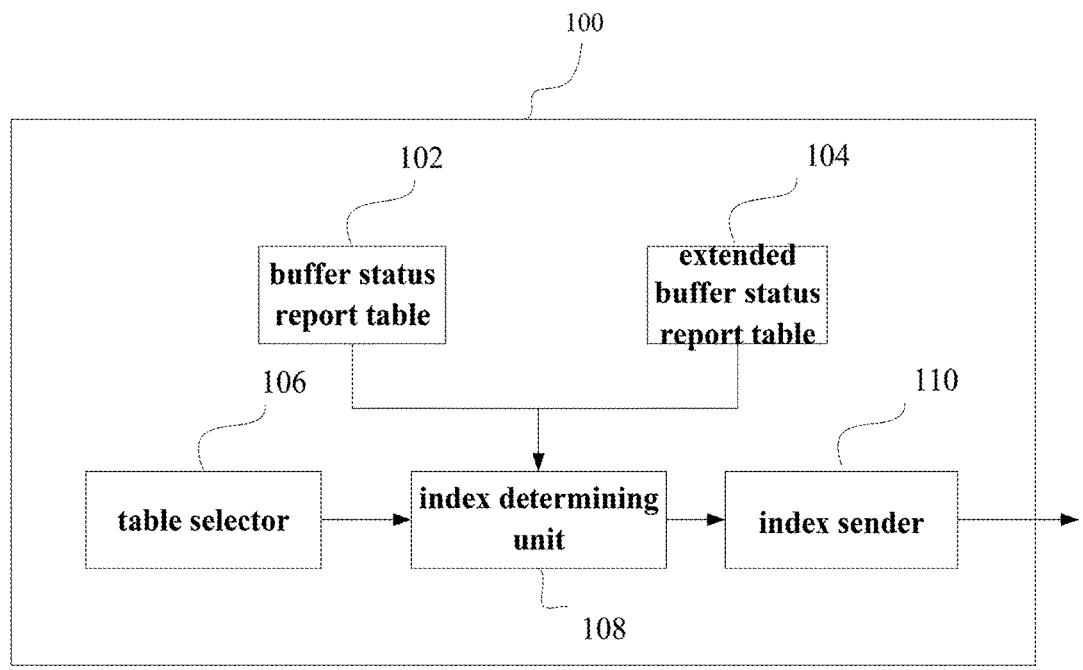
FIG. 1 is a block diagram of a terminal according to an embodiment of the present invention.

The illustrative embodiments of the present invention will be described in conjunction with the drawings hereinafter. For the purpose of clarity and conciseness, not all the characteristics of the practical embodiments are described in the description. However, it should be understood that many decisions specific to the embodiment must be made in developing any of this kinds of practical embodiments, so as to achieve the specific object of the developer, for example, in accordance with those restrictive conditions related to the system and the service, and those restrictive conditions may change with different implements. Furthermore, it should also be understood that this kind of development work is only routine task for those skilled in the art benefiting from this disclosure, although the development work may be very complicated and take time.

Here, it is also necessary to be noted that only the device structures and/or process steps closely related to the scheme according to the present invention are illustrated in the drawings and other details which has little relation with the present invention are omitted, in order to prevent the present invention from being blurred by the unnecessary details.

As described above, the object of the present invention is to extend the BSR table for adapting to a higher data transmission speed. In the technical solution of the present invention, besides the existing BSR table, at least one extended BSR table is added. The embodiments of the present invention further provide a BSR reporting method, and a BSR obtaining method in case of adding at least one extended BSR table, and a base station, a terminal and a communication system related thereto.

The embodiments of the present invention further provide a terminal which is adaptive in case of adding at least one extended BSR table. FIG. 1 is a block diagram of a terminal 100 according to an embodiment of the present invention. As shown in FIG. 1, the terminal 100 includes a BSR table 102;

an extended BSR table 104; a table selector 106; an index determining unit 108; and an index sender 110.

It should be noted that, the number of the extended BSR table 104 shown in FIG. 1 is one for keeping the drawing concise. However, FIG. 1 is only an example, and the present invention is not limited to this. It is obvious that the number of the extended BSR table 104 may be two or more.

Referring to FIG. 1, the BSR table 102 may be the existing BSR table shown in FIG. 10. For example, the range of the buffer data of the BSR table 102 is for example between 0 and 150 K, and the range is divided into 64 small intervals according to the method of the technical document 1. However, the BSR table 102 is not limited to this. For example, the range of the buffer data is not always between 0 and 150 K, but may be any other range. Moreover, the number of the small interval is not always 64, but may be any other number. For all this, the description is performed by taking the range between 0 and 150 K and the 64 small intervals as an example in the following description.

Referring to FIG. 1, the extended BSR table 104 may be a table for extending the existing BSR table so as to adapt to the higher data transmission speed.

In an embodiment, the range of the buffer data amount of the extended BSR table 104 and the range of the buffer data amount of the BSR table 102 may have a succession relationship. For example, the lower limit of the range of the buffer data amount of the extended BSR table 104 may be the upper limit of the range of the buffer data amount of the BSR table 102, such as 150 K; and the upper limit of the range of the buffer data amount of the extended BSR table 104 may be the maximum buffer data amount specified in the protocol standard or determined according to the practical application, such as 1200 K or 1500 K.

In another embodiment, the range of the buffer data amount of the extended BSR table 104 and the range of the buffer data amount of the BSR table 102 may have an inclusion relationship. For example, the extended BSR table 104 may be the extended BSR table according to the technical document 2. In this case, the lower limit of the range of the buffer data amount of the extended BSR table 104 is the same as the lower limit of the range of the buffer data amount of the BSR table 102, for example may be 0; and the upper limit of the range of the buffer data amount of the extended BSR table 104 may be the maximum buffer data amount specified in the protocol standard or determined according to the practical application, such as 1200 K or 1500 K.

Furthermore, for the extended BSR table 104 and the BSR table 102, the range of the buffer data amount may be divided into a plurality of small intervals with various suitable methods. For example, the range of the buffer data amount may be divided into a plurality of small intervals with the method of the technical document 1. FIG. 12 and FIG. 13 show respectively the extended BSR tables obtained with the method of the technical document 1, in which the ranges of the buffer data amounts are respectively between 150 K and 1200 K and between 150 K and 1500 K. However, the extended BSR table 104 is not limited to this. For example, the number of the small intervals is not always 64, but may be any other number. For all this, the description is performed by taking the 64 small intervals as an example in the following description.

Furthermore, with the further development of the communication technique, the amount of the data to be reported by the terminal may further increase, thus a plurality of extended BSR tables may also be adopted. In case of existing a plurality of extended BSR tables, the ranges of the buffer data amounts of individual extended BSR tables may have a succession relationship or an inclusion relationship.

In an embodiment of the present invention, the ranges of the buffer data amounts of individual extended BSR tables may have a succession relationship. Specifically, the amount of the data to be reported by the terminal may be divided into several successive segments, with each segment being represented by one extended BSR table.

In another embodiment of the present invention, the ranges of the buffer data amounts of individual extended BSR tables may have an inclusion relationship. Specifically, each of the extended BSR tables have the same upper limit of the range of the buffer data, such as OK; however, each extended BSR table has a different upper limit of the range of the buffer data so as to adapt to various data speeds.

Returning to FIG. 1, the table selector 106 is adapted to select a table from the buffer status report table 102 and the at least one extended buffer status report table 104, and notify the index determining unit 108 of the selection result. Furthermore, the table selector 106 may perform the selection actively and notify the base station of the selection result by an indication signaling; alternatively, the table selector 106 may perform the selection passively according to an indication signaling from the base station (not shown in FIG. 1).

In an embodiment, the table selector 106 may select passively a table from the buffer status report table 102 and the at least one extended buffer status report table 104 according to an indication signaling from the base station. Specifically, the table selector 106 receives an indication signaling from the base station, determines which table to select according to this indication signaling, and notifies the index determining unit 108 of the selection result.

And in another embodiment, the table selector 106 may select actively a table from the buffer status report table 102 and the at least one extended buffer status report table 104, then notify directly the index determining unit of the selection result and notify the base station of the selection result by an indication signaling.

If the table selector 106 performs the selection actively, the table selector 106 may firstly select the table according to the data amount in the buffer of the terminal or according to the type of the terminal and the data amount in the buffer of the terminal.

In an embodiment, the table selector 106 may select the table according to the data amount in the buffer of the terminal. For example, if the table selector 106 finds out that the data amount in the buffer of the terminal is in the range between 0 and 150 K, then the table selector 106 selects the BSR table 102; and if the table selector 106 finds out that the data amount in the buffer of the terminal is over 150 K, then the table selector 106 selects the extended BSR table 104. Furthermore, in case of existing a plurality of extended BSR tables, the table selector 106 may select a corresponding extended BSR table according to the data amount in the buffer of the terminal.

In another embodiment, the table selector 106 may select the table according to the type of the terminal and the data amount in the buffer of the terminal. For example, if the table selector 106 finds out that the terminal is a LTE device, the table selector 106 may select the BSR table 102, and if the table selector 106 finds out that the terminal is a LTE-A device, the table selector 106 may select directly the extended BSR table 104; alternatively, the table selector 106 may further perform the selection in conjunction with the data amount in the buffer of the terminal, i.e., if the data amount in the buffer of the terminal is in the range between 0 and 150 K, then the table selector 106 selects the BSR table 102; and if the data amount in the buffer of the terminal is over 150 K, then the table selector 106 selects the extended BSR table 104. Furthermore, in case of existing a plurality of extended BSR tables, the table selector 106 may select a corresponding extended BSR table according to the data amount in the buffer of the terminal.

Then the table selector 106 may notify directly the index determining unit 108 of the selection result, and notify the base station of the selection result by an indication signaling.

It can be seen that, whether the table selector perform the selection actively or passively, the information on which index corresponds to which table needs to be transmitted between the terminal and the base station by an indication signaling. The indication signaling may be any kinds of suitable protocol message, for example a Radio Resource Control (RRC) signaling or a Media Access Control (MAC) signaling.

In a case in which the terminal receives an indication signaling from the base station and selects a table according to the indication signaling, the indication signaling may be for example a RRC signaling.

In an embodiment, the table selector 106 may receive a RRC signaling as an indication signaling from the base station to determine to select which table. For example, as shown in FIG. 5, the table selector 106 may determine to select which table according to the table indication information in a RRC Connection Setup signaling received by the base station.

In another aspect, in a case in which the terminal selects actively a BSR table and notifies the base station of the selection result by an indication signaling, the table selector 106 in the terminal may notify the base station of the selected table by taking the RRC signaling or the MAC signaling as an indication signaling, i.e., notify the base station that the received index corresponds to the information on which one of the BSR table and the extended buffer status table.

In an embodiment, the table selector 106 may notify the base station of the selected table by taking the RRC signaling as an indication signaling.

Figure 5:
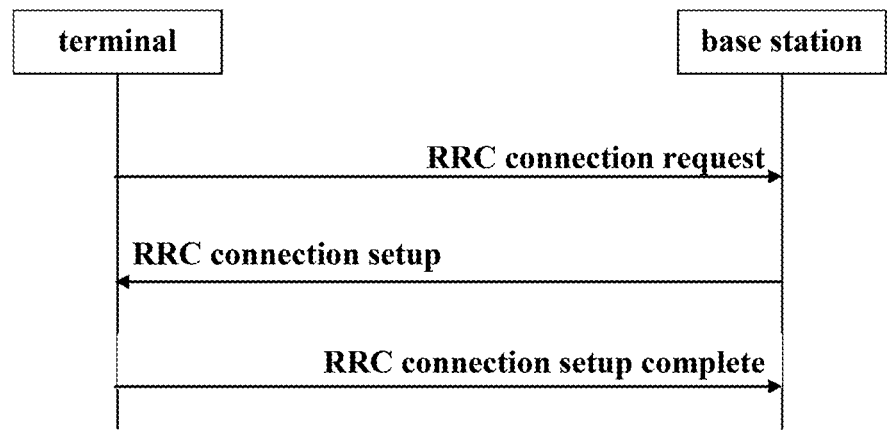
FIG. 5 is an illustrative diagram of a Radio Resource Control (RRC) signaling used in a BSR report method of a terminal and/or a BSR report obtaining method of a base station according to an embodiment of the present invention.

In a specific embodiment, as shown in FIG. 5, the table selector 106 may for example notify the base station of the selected table by sending a RRC Connection Setup Complete signaling or a RRC Connection Request signaling including the table indication information to the base station.

In another embodiment, the table selector 106 may notify the base station of the selected table by taking the MAC signaling as an indication signaling.

In a specific embodiment, the table selector 106 may notify the base station of which table is the selected one by using a Logic Channel Identity (LCID) in the MAC signaling. Specifically, in a case in which the value of the BSR is from the extended BSR table 104, a new LCID is defined respectively for a long BSR, a short BSR, and a shorten BSR, and then the table selector 106 may use the value of this newly defined LCID to indicate the type of the BSR and to indicate that the table used by the terminal is an extended BSR table. In a case in which the value of the BSR is from the BSR table 102, the table selector 106 may use the value of the LCID that has been defined presently in the protocol to indicate that the table used by the terminal is the BSR table 102.

Figure 6:
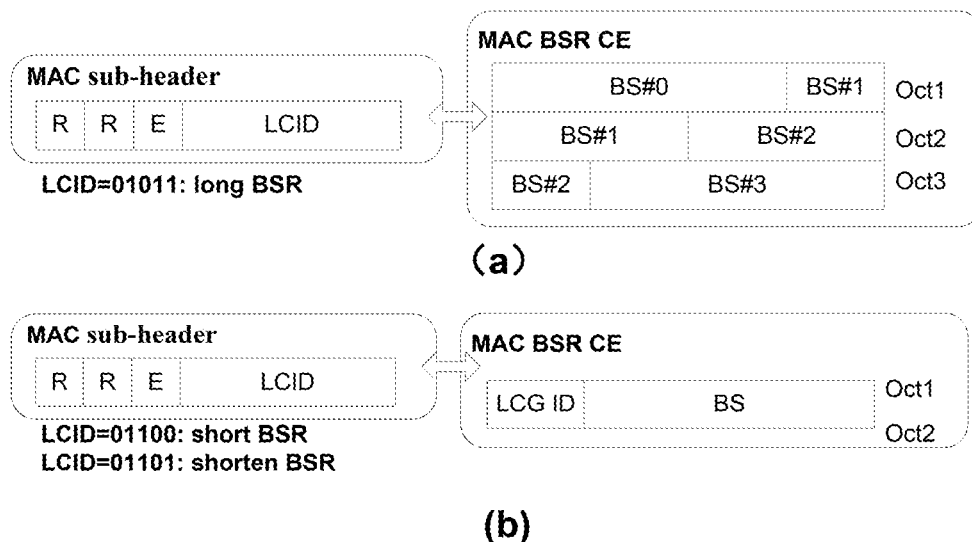
FIG. 6 is an illustrative diagram of a Media Access Control (MAC) signaling used in a BSR report method of a terminal and/or a BSR report obtaining method of a base station according to an embodiment of the present invention.

For example, as shown in FIG. 6, three new LCID values are defined, 01011, 01100 and 01101, in which LCID=01011 indicates that the BSR in this MAC signaling is a long BSR, and the value of the BSR is from an extended BSR table; LCID=01100 indicates that the BSR in this MAC signaling is a short BSR, and the value of the BSR is from an extended BSR table; and LCID=01101 indicates that the BSR in this MAC signaling is a shorten BSR, and the value of the BSR is from an extended BSR table. Thus, the terminal may indicate the type of the BSR and indicate that the selected table is an extended BSR table by means of the three newly defined LCID values. Furthermore, the logic values shown in FIG. 6 are only examples but not to limit, and it is apparently that other suitable form of logic values may also be adopted.

In this specific embodiment, the notification the base station of the type of the BSR and the type of the BSR table is achieved in a simple manner by the newly defined LCID value. However, in this specific embodiment, no distinguishing is provided between the four logic channel groups in the long BSR. That is to say, all the logic channel groups in the long BSR are not represented specifically, such as the BSR of BS #0 to BS #3 are from which table.

To select more accurately the suitable table based on the data amounts of individual logic channel groups, it is necessary to point out for the base station that which logic channel group uses which table. Therefore, in another specific embodiment, an additional byte may be added into the MAC signaling, and the table selector 106 uses the LCID and at least certain bits of this additional byte in the MAC signaling to notify the base station that the terminal selects which table for each logic channel group.

Specifically, for the short BSR or the shorten BSR, similarly to the previous specific embodiment, the table selector 106 may use the LCID value that has been defined presently in the protocol to indicate that the table used by the terminal is the BSR table 102, and use the newly defined LCID value to indicate that the table used by the terminal is the extended BSR table 104. In another embodiment, it may be unnecessary to define a new LCD, and whether the used table is the BSR table or the extended BSR table is indicated by one bit in the additional byte, which case is similar to the case of the long BSR described in the following.

For a long BSR, in a case in which the BSRs of the four logic channel groups in the long BSR each may be indicated by the BSR table 102 (for example, in a case in which the buffer data amount reported in each logic channel group is less than 150 K), the table selector 106 may indicate this case by the existing LCID value in the protocol. However, in a case in which one or more BSRs of the four logic channel groups in the long BSR adapts to the extended BSR table 104 (for example, in a case in which the buffer data amount reported in at least one logic channel group is beyond 150 K), the table selector 106 may use the new LCID value to indicate that the type of the BSR is the long BSR and not all the BSRs use the BSR table, and use the four bits in the additional byte to further indicate that the BSRs of the four logic channel groups in this long BSR are respectively from which table. Specifically, the table selector 106 may use the existing LCID value or the newly defined LCID value to indicate that the type of the BSR is the long BSR, and use the LCID value and the four bits in the additional byte to further indicate that the BSRs of the four logic channel groups in this long BSR are respectively from which table. However, it may also be unnecessary to define the new LCID, and only the existing LCID is used. In this case, the LCID is only used to indicate the type of the BSR, and only the bit in the additional byte is used to indicate that individual logic channel group corresponds to which table.

For example, as shown in FIG. 7, the table selector 106 uses the last four bits ($BTI_0$, $BTI_1$, $BTI_2$, $BTI_3$) in the additional byte to indicate that the BSRs of the four logic channel groups in this long BSR are respectively from which table. For example, if the LCID value corresponds to the long BSR and ($BTI_0$, $BTI_1$, $BTI_2$, $BTI_3$)=1010, then the values of the BSRs that may indicate the logic channel group BS #0 and BS #2 in the long BSR are from the extended BSR table 104; and the values of the BSRs of the logic channel group BS #1 and BS #3 are from the BSR table 102. Furthermore, the logic bit setting shown in FIG. 7 is only an example but not a limitation, and it is obvious that other suitable form of logic bit settings may also be adopted. For example, it is not always that the last four bits in the additional byte are used but other four bits may also be used, and "1" may be used to indicate the BSR table 102 and "0" may be used to indicate the extended BSR table, and the like.

Furthermore, in another specific embodiment, the table selector 106 may use the LCID and the reserved bit in the sub-header in the MAC signaling to notify the base station that the selected table is which one. Specifically, the notification the base station that the table selected by the terminal for each logic channel group is which one may be performed by using two bits in the LCID value and the two reserved bits in the sub-header.

Considering that in the existing LTE system, the LCID value in the range between 01011 and 11001 are the reserved LCD, thus the table selector 106 may use the last two bits of the four LCID value 10000, 10001, 10010 and 10011 and the first two reserved bits RR in the sub-header to indicate that the table selected by the terminal for each logic channel group is which one, as shown in FIG. 8.

For example, if RR=00 and LCID=10011, it may indicate that the BSR is a long BSR and the value of the BSRs of the logic channel group BS #0 and BS #1 in this long BSR are from the BSR table 102 and the values of the BSRs of the logic channel group BS #2 and BS #3 are from the extended BSR table 104. Furthermore, the logic bit setting and the selected LCID reserved value shown in FIG. 8 are only an example but not a limitation, and it is obvious that other suitable form of logic bit settings and LCID reserved values may also be adopted, and "1" may be used to indicate the BSR table 102 and "0" may be used to indicate the extended BSR table.

In the above specific embodiment, no distinguishing is provided for the case in which the number of the extended BSR table is two or more than two. Therefore, in another specific embodiment, an additional byte may be added into the MAC singling, and then the table selector 106 uses the LCID and this additional byte in the MAC signaling to indicate that the terminal selects which table of the BSR table and a plurality of extended BSR tables.

For example, for the short BSR and the shorten BSR, the table selector 106 may indicate that the table used by the terminal is the BSR table 102 by the LCID value that has been defined presently in the protocol; indicate that the table used by the terminal is the extended BSR table by the newly defined LCID value; and indicate that the used extended BSR table is which extended BSR table by the table number bit in the additional byte Oct1 in FIG. 9. In another embodiment, it may be unnecessary to define a new LCD, and the table number bit in the additional byte is used to indicate that which table is the used one, which case is similar to the case of the long BSR described in the following.

For the long BSR, in a case in which the BSRs of the four logic channel groups in the long BSR each may be indicated by the BSR table 102 (for example, in a case in which the buffer data amount reported in each logic channel group is less than 150 K), the table selector 106 may indicate this case by the existing LCID value in the protocol. However, in a case in which one or more BSRs of the four logic channel groups in the long BSR adapts to the extended BSR table 104 (for example, in a case in which the buffer data amount reported in at least one logic channel group is beyond 150 K), the table selector 106 may use the new LCID value to indicate that the BSR used by the terminal is the long BSR and not all the BSRs use the BSR table, and use the table number bit in the additional byte in FIG. 9 (a) to further indicate that the BSRs of the four logic channel groups in this long BSR are respectively from which table. Specifically, the table selector 106 may use the existing LCID value or the newly defined LCID value to indicate that the type of the BSR is the long BSR, and use the LCID value and the table number bit in the additional byte to further indicate that the BSRs of the four logic channel groups in this long BSR are respectively from which table. However, it may also be unnecessary to define the new LCD, and only the present LCID is used. In this case, the LCID is only used to indicate the type of the BSR, and only the bit in the additional byte is used to indicate that which logic channel group corresponds to which table.

In the additional byte, two bits of table number bits may be used to indicate that the corresponding BSR value is from which BSR table. The logic bit setting and the number of the bit indicating the table number shown in FIG. 9 are only an example but not a limitation, and it is obvious that other suitable form of logic bit setting and other number of bits may be adopted to indicate the table number.

Furthermore, the above specific embodiment described in conjunction with FIG. 7 may also seem to be another embodiment of the specific embodiment described in conjunction with FIG. 9. Specifically, in the specific embodiment described in FIG. 7, one extended BSR table is involved and one bit of table number bit is used to indicate that the used table is which table of the BSR table and the extended BSR table; and in the specific embodiment described in FIG. 9, a plurality of extended BSR tables are involved and two bits of table number bits are used to indicate that the used table is which table of the BSR table and the extended BSR table.

Returning to FIG. 1, the index determining unit 108 obtains, according to the data amount in the buffer of the terminal, the corresponding index from the table selected by the table selector 106, and sends this index to the index sender 110, by which the index is sent to the base station.

Thereby, the terminal which is adaptive in case of adding at least one extended BSR table is implemented.

Figure 3:
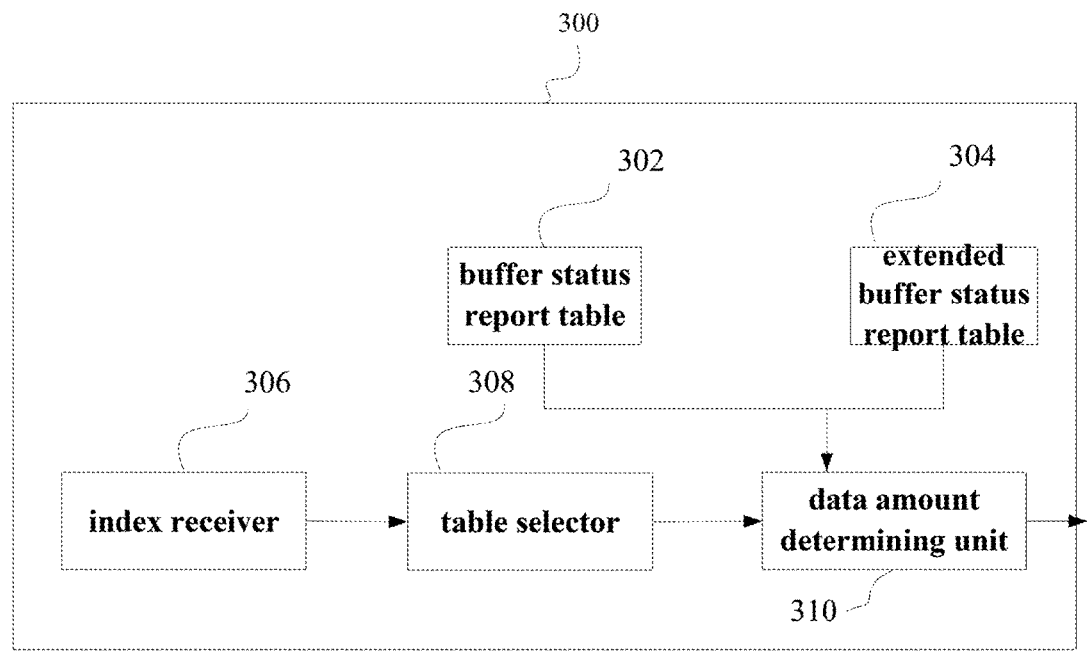
FIG. 3 is a block diagram of a base station according to an embodiment of the present invention.

Correspondingly, the embodiment of the present invention further provides a base station which is adaptive in case of adding at least one extended BSR table. FIG. 3 is a block diagram of a base station 300 according to an embodiment of the present invention. As shown in FIG. 3, the base station includes a BSR table 302, an extended BSR table 304, an index receiver 306, a table selector 308 and a data amount determining unit 310.

It should be noted that, the number of the extended BSR table 304 shown in FIG. 3 is one for keeping the drawing concise. However, FIG. 3 is only an example, and the present invention is not limited to this. It is obvious that the number of the extended BSR table 104 may be two or more.

The BSR table 302 and the extended BSR table 304 in FIG. 3 may correspond to the BSR table 102 and the extended BSR table 104 in FIG. 1 respectively, and the details of the BSR table 302 and the extended BSR table 304 will not be described any more here for keeping the description concise.

Referring to FIG. 3, the table selector 308 is adapted to select a table from the buffer status report table 302 and at least one extended buffer status report table 304, and notify the data amount determining unit 310 of the selection result. The table selector 308 may perform the selection actively and notify the terminal of the selection result by an indication signaling; alternatively, the table selector 308 may perform the selection passively according to an indication signaling from the terminal (not shown in FIG. 3).

In an embodiment, the table selector 308 may select passively a table from the buffer status report table 102 and the at least one extended buffer status report table 104 according to an indication signaling from the terminal. Specifically, the table selector 308 receives an indication signaling from the terminal, determines which table to select according to this indication signaling, and notifies the data amount determining unit 310 of the selection result.

And in another embodiment, the table selector 308 may select actively a table from the buffer status report table 302 and the at least one extended buffer status report table 304, then notify directly the data amount determining unit of the selection result and notify the terminal of the selection result by an indication signaling.

In an embodiment, the table selector 308 may select the table according to the type of the terminal. Specifically, if the table selector 308 finds out that the terminal is a LTE device, the table selector 308 may select the BSR table 302 for this terminal, and if the table selector 308 finds out that the terminal is a LTE-A device, the table selector 308 may select the extended BSR table 304 for this terminal.

In a case in which the table selector 308 performs the selection actively, the table selector 308 may notify directly the index receiver 306 of the selection result, and notify the terminal of the selection result by an indication signaling.

It can be seen that, whether the table selector perform the selection actively or passively, the information on which index corresponds to which table needs to be transmitted between the terminal and the base station by an indication signaling. The indication signaling may be any kinds of suitable protocol message, for example a Radio Resource Control (RRC) signaling or a Media Access Control (MAC) signaling.

In a case in which the base selects actively the BSR table and notifies the terminal of the selection result by an indication signaling, the indication signaling may be for example a RRC signaling.

In an embodiment, the table selector 308 may send to the terminal a RRC signaling as an indication signaling to notify the terminal that which table should be selected. For example, as shown in FIG. 5, the table selector 308 in the base station may notify the terminal that which table should be selected in a RRC Connection Setup signaling sent to the terminal.

In another aspect, in a case in which the base station receives the indication signaling from the terminal, the table selector 308 in the base station may receive from the terminal the RRC signaling or the MAC signaling as an indication signaling, (i.e., obtain information on which one of the BSR table and the extended buffer status table corresponds to the index received by the index receiver 306 in the base station), and select the table according to the BSR table indication information in this indication signaling.

In an embodiment, the table selector 308 may obtain from the terminal the RRC signaling as an indication signaling, and select the table according to this indication signaling.

In a specific embodiment, as shown in FIG. 5, the table selector 308 may for example select the table according to a RRC Connection Setup Complete signaling or a RRC Connection Request signaling from the terminal.

In another embodiment, the table selector 308 may obtain from the terminal the MAC signaling as an indication signaling, and thus know that the table selected by the terminal is which table.

In a specific embodiment, the table selector 308 may determine that the table selected by the terminal is which table according to the LCID in the MAC signaling obtained from the terminal.

In another specific embodiment, the table selector 308 may determine that the table selected by the terminal is which table according to the LCD and at least certain bits in one additional byte in the MAC signaling.

In another specific embodiment, the table selector 308 may determine that the table selected by the terminal is which table according to the LCD and the reserved bit in the sub-header in the MAC signaling.

Regarding to the specific details about the MAC signaling and the RRC signaling, reference may be made to the content described in conjunction with FIG. 5 to FIG. 9 in the above, which will not be described any more here for making the description concise.

Returning to FIG. 3, the index receiver 306 receives the selection result provided by the table selector 308 and the index number reported by the terminal (not shown in FIG. 3), and provides the received selection result and index number to the data amount determining unit 310.

Furthermore, although it is shown in FIG. 3 that, the table selector 308 sends the selection result of the table to the index selector 306, and the index selector 306 provides the index received from the terminal and the selection result of the table received from the table selector 308 to the data amount determining unit 310, the FIG. 3 is only an example, and the present invention is not limited to this.

For example, in another embodiment of the present invention, the index receiver may receive only the index and provide the received index to the data amount determining unit, and the table selector may send directly the selection result of the table to the data amount determining unit.

In this case, the processes of the table selector and the index receiver may or may not be performed simultaneously, i.e., the process of the table selector may be performed before or after the process of the index receiver.

Returning to FIG. 3, the data amount determining unit 310 obtains, according to the index received by the index receiver 306, a corresponding range of the data mount from the table selected by the table selector 308, thereby the base station obtains the status report of the buffer in the terminal.

Thereby, the base station which is adaptive in case of adding at least one extended BSR table is implemented.

The embodiment of the present invention further provides a BSR report method of a terminal which is adaptive in case of adding at least one extended BSR table.

Figure 2:
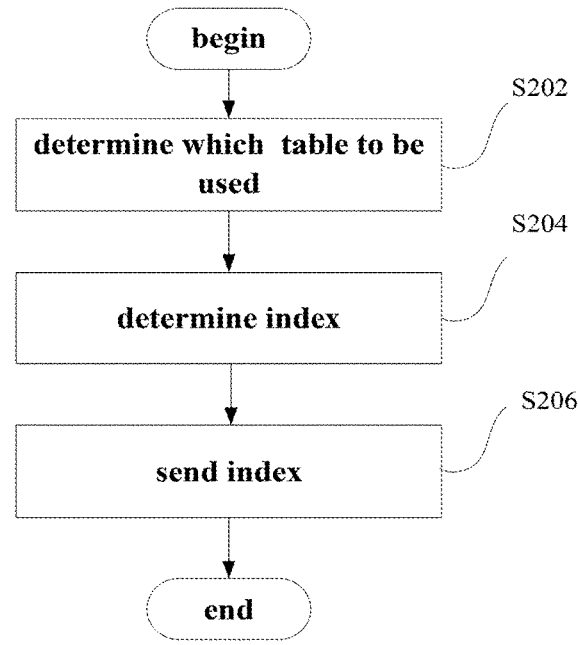
FIG. 2 is a flow chart of a BSR report method of a terminal according to an embodiment of the present invention.

FIG. 2 is a flow chart of a BSR report method of a terminal according to an embodiment of the present invention.

As shown in FIG. 2, the selecting of the table is performed at the step S202, so as to select a table from the BSR table and at least one extended BSR table.

The BSR table and the extended BSR table may correspond to the BSR table 102 and the extended BSR table 104 in FIG. 1 respectively, and the details of the BSR table 302 and the extended BSR table 304 will not be described any more here for keeping the description concise.

Furthermore, the step of selecting the table may be performed by the terminal actively, and may also be performed passively according to the indication signaling from the base station.

In an embodiment of the present invention, the step of selecting the table may be performed by the terminal actively. Specifically, the terminal may select the table according to the data amount in the buffer of the terminal or according to the data amount in the buffer of the terminal and the type of the terminal, and notify the base station of the selection result by the indication signaling.

In a specific embodiment, the indication signaling may be a RRC signaling such as a RRC Connection Request signaling or a RRC Connection Setup Complete signaling.

Specifically, in the step of selecting the table, the terminal may notify the base station of the selected table by the RRC Connection Request signaling or the RRC Connection Setup Complete signaling.

In another specific embodiment, the indication signaling may be a MAC signaling.

For example, in the step of selecting the table, the terminal may notify the base station of the selected table by the LCID in the MAC signaling.

Alternatively, in the step of selecting the table, the terminal may notify the base station of the selected table by the LCID and at least certain bits in one additional byte in the MAC signaling.

Alternatively, in the step of selecting the table, the terminal may notify the base station of the selected table by using two bits in the LCID and the reserved bit in the sub-header in the MAC signaling.

In another aspect, in another embodiment of the present invention, the step of selecting the table may be performed according to the indication signaling from the base station. For example, the base may select the table according to the type of the terminal, and notify the terminal of the selection result by the indication signaling, and the terminal selects the table according to the indication signaling from the base station.

In a specific embodiment, the indication signaling may be a RRC signaling such as the RRC Connection Setup signaling.

Specifically, in the step of selecting the table, the base station may notify the terminal of the selected table by the RRC Connection Setup signaling.

Regarding the specific usage of the RRC signaling and the MAC signaling, reference may be made to the related description made in conjunction with FIG. 5 to FIG. 9 in the above, which will not be described any more here for keeping the description concise.

Returning to FIG. 2, then in S204, the index is obtained from the table selected in S202 according to the data amount in the buffer of the terminal.

Then in S206, the index is reported to the base station.

Thereby, the BSR report method of the terminal which is adaptive in case of adding at least one extended BSR table is implemented.

Correspondingly, the embodiment of the present invention further provides a BSR obtaining method of a base station which is adaptive in case of adding at least one extended BSR table.

Figure 4:
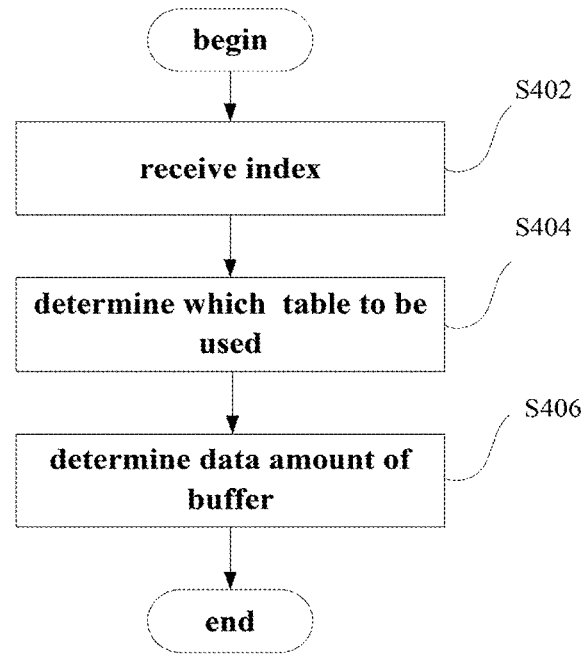
FIG. 4 is a flow chart of a BSR report obtaining method at a base station according to an embodiment of the present invention.

FIG. 4 is a flow chart of a BSR obtaining method at a base station according to an embodiment of the present invention.

As shown in FIG. 4, the selecting of the table is performed at the step S402, so as to select a table from the BSR table and at least one extended BSR table.

It should be noted that, the BSR table and the extended BSR table may correspond to the BSR table 102 and the extended BSR table 104 in FIG. 1 respectively, and the details of the BSR table 302 and the extended BSR table 304 will not be described any more here for keeping the description concise.

Furthermore, the step of selecting the table may be performed by the base station actively, and may also be performed passively according to the indication signaling from the terminal.

In an embodiment of the present invention, the step of selecting the table may be performed by the base station actively. For example, the base station may select the table according to the type of the terminal, and notify the terminal of the selection result by the indication signaling.

In a specific embodiment, the indication signaling may be a RRC signaling such as a RRC Connection Setup signaling.

In another aspect, in another embodiment of the present invention, the step of selecting the table may be performed by the base station according to the indication signaling from the terminal. Specifically, the base station may select the table according to the indication signaling from the terminal.

In a specific embodiment, the indication signaling may be a RRC signaling such as the RRC Connection Request signaling and the RRC Connection Setup Complete signaling.

In another specific embodiment, the indication signaling may be a MAC signaling.

For example, in the step of selecting the table, the base station may select the table corresponding to the index according to the LCID in the MAC signaling from the terminal.

Alternatively, in the step of selecting the table, the base station may select the table corresponding to the index according to the LCID and at least certain bits in one additional byte in the MAC signaling from the terminal.

Alternatively, in the step of selecting the table, the base station may select the table corresponding to the index according to two bits in the LCID and the reserved bit in the sub-header in the MAC signaling from the terminal.

Regarding the specific details of the RRC signaling and the MAC signaling, reference may be made to the related description made in conjunction with FIG. 5 to FIG. 9 in the above, which will not be described any more here for keeping the description concise.

Returning to FIG. 4, then in S404, the step of receiving the index is performed to receive the index from the terminal.

It should be noted that, although the step of receiving the index is shown to be performed after the step of selecting the table in FIG. 4, FIG. 4 is only an example, and the present invention is not limited to this. For example, the steps of receiving the index and selecting the table may be performed simultaneously, and alternatively, the step of selecting the table may be performed after the step of receiving the index.

Returning to FIG. 4, then in S406, the data amount in the buffer of the terminal is determined from the selected table according to the received index.

Thereby, the BSR receiving method at the base station which is adaptive in case of adding at least one extended BSR table is implemented.

Besides the above base station, terminal and method, the present invention further provides a communication system which is adaptive in case of adding at least one extended BSR table. The system includes at least one terminal and at least base station, in which the terminal is the terminal according to any one of the above embodiment, and the base station is the base station according to any one of the above embodiment.

Furthermore, it should be understood that, all the examples and embodiments described herein are illustrative, and the present invention is not limited to this. The reference numerals are only for clear description of the present invention. Therefore, the reference numerals should not be deemed to have any limited meaning.

Individual composition modules and units in the above device may be configured in a manner of software, firmware, hardware or a combination thereof. And the specific means and manners that may be used by the configuration are well known to those skilled in the art, which will not be described in detail here. In a case in which the configuration is implemented by software or firmware, the program constituting this software is mounted into the computer which has a specific hardware structure (such as the general purpose computer 1400 shown in FIG. 14) from the storage medium or the network, and the computer may perform various functions when being mounted with various programs.

Figure 14:
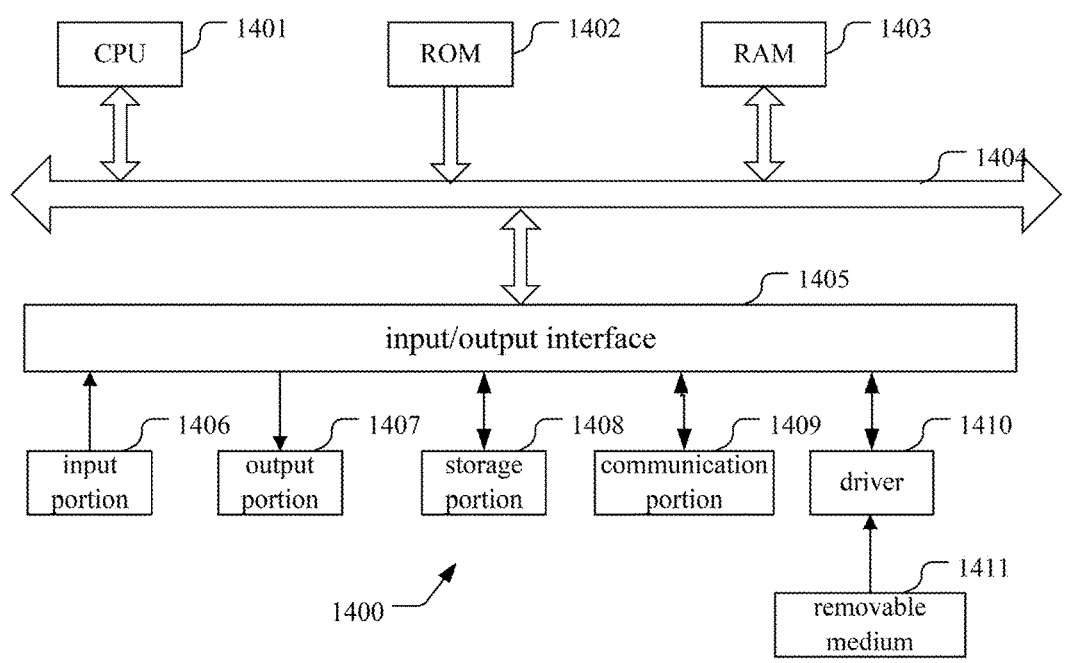
FIG. 14 is an illustrative structure block diagram of a general personal computer in which a method and/or a device according to an embodiment of the present invention may be implemented.

In FIG. 14, the Central Processing Unit (CPU) 1401 performs various processes according to the program stored in the Read Only Memory (ROM) 1402 or the program loaded to the Random Access Memory (RAM) 1403 from the storage portion 1408. In the RAM 1403, the data required in performing various processes and the like by the CPU 1401 is also stored as required. The CPU 1401, the ROM 1402 and the RAM 1403 are connected to each other via the bus 1404. The output/input interface is also connected to the bus 1404.

The following components are connected to the input/output interface 1405: the input portion 1406 (including the keyboard, the mouse and the like), the output portion 1407 (including the display, such as the Cathode Ray Tube (CRT), the Liquid Crystal Display (LCD) and the like, and the speaker and the like), the storage portion 1408 (including the hard disk and the like), and the communication portion 1409 (including network interface card, such as LAN card, the modem and the like). The communication portion 1409 performs the communication processes via the network such as Internet. As it is necessary, the driver 1410 may also connected to the input/output interface 1405. The removable medium 1411, such as magnetic disk, optical disk, magnetic optical disk, semiconductor memory unit, is mounted on the driver 1410 as required, so that the computer program read out from the removable medium 1411 is mounted into the storage portion 1408 as required.

In a case in which the above serious processes are performed by software, the program composing the software is mounted from the network such as Internet or from the storage medium such as the removable medium 1411.

It should be understood by those skilled in the art that, this kind of storage medium is not limited to the removable medium 1411 shown in FIG. 14, in which the program is stored and distribution is performed separately from the device to provide the user with the program. Examples of the removable medium 1411 include magnetic disk (including floppy disk (registered trademark)), optical disk (including Compact Disk-Read Only Memory (CD-ROM) and Digital Versatile Disc (DVD)), magnetic optical disk (including Mini-Disk (MD) (registered trademark)) and semiconductor memory unit. Alternatively, the storage medium may be ROM 1402, the hard disk stored in the storage portion 1408 and the like, which stores the program and is distributed to the user together with the device containing the storage mediums.

The present invention further provides a program product stored with instruction code readable to machine. When the instruction code is read and executed by the machine, the above method according to the embodiment of the present invention may be performed.

Correspondingly, the storage medium for carrying the program product stored with the instruction code readable to machine is also included in the disclosure of the present invention. The storage medium includes but not limited to the floppy disk, the optical disk, the magnetic disk, the memory card, memory stick and the like.

At last, it is necessary to note that, the term "include", "contain" or any other variations are meant to cover the nonexclusive including, so that the procedure, method, article or device including a series of elements includes not only those elements but also other elements which are not list expressly, or but also the intrinsic elements of this kind of procedure, method, article or device. Furthermore, in a case in which there is no more limitation, the element defined by the sentence "include one" does not exclude that there are other same elements in the procedure, method, article or device including the element.

Although the embodiments of the present invention are described in the above in conjunction with the drawings, it should be understood that the embodiments described above are only used to describe the present invention, but not to limit the present invention. Various modifications and variations may be made to the above embodiments by those skilled in the art without deviating from the spirit and the scope of the present invention. Therefore, the scope of the present invention is only limited by the appended claims and the equivalent meaning thereof.

It can be seen from the above description that, the embodiments of the present invention provide the following technical solutions.

Technical solution 1. A terminal, comprising:
a buffer status report table;
at least one extended buffer status report table;
a table selector, adapted to select a table from the buffer status report table and the at least one extended buffer status report table;
an index determining unit, adapted to obtain an index from the table, according to a data amount in a buffer of the terminal; and
an index sender, adapted to send the index to the base station.

Technical solution 2. The terminal according to Technical solution 1, wherein
the table selector is adapted to select the table according to the data amount in the buffer of the terminal; and
send an indication signaling for indicating which table of the buffer status report table and the at least one extended buffer status report table corresponds to the index to a base station.

Technical solution 3. The terminal according to Technical solution 2, wherein the table selector is adapted to send an RRC (Radio Resource Control) signaling.

Technical solution 4. The terminal according to Technical solution 3, wherein the table selector is adapted to send an RRC Connection Request signaling or an RRC Connection Setup Complete signaling.

Technical solution 5. The terminal according to Technical solution 2, wherein the table selector is adapted to send an MAC (Medium Access Control) signaling.

Technical solution 6. The terminal according to Technical solution 5, wherein the table selector is adapted to use an LCID (Logic Channel Identity) in the MAC signaling to indicate which table of the buffer status report table and the at least one extended buffer status report table corresponds to the index.

Technical solution 7. The terminal according to Technical solution 5, wherein the table selector is adapted to use an LCID and at least certain bits of an additional byte in the MAC signaling to indicate which table of the buffer status report table and the at least one extended buffer status report table corresponds to the index.

Technical solution 8. The terminal according to Technical solution 5, wherein the table selector is adapted to use an LCD and a preserved bit in a subhead of the MAC signaling to indicate which table of the buffer status report table and the at least one extended buffer status report table corresponds to the index.

Technical solution 9. The terminal according to Technical solution 1, wherein the table selector is adapted to select a table from the buffer status report table and the at least one extended buffer status report table, according to an indication signaling received from a base station.

Technical solution 10. The terminal according to Technical solution 9, wherein the table selector is adapted to receive an RRC (Radio Resource Control) signaling.

Technical solution 11. The terminal according to Technical solution 10, wherein the table selector is adapted to receive an RRC Connection Setup signaling.

Technical solution 12. The terminal according to any one of Technical solutions 1-11, wherein a range of the buffer data amount corresponding to the buffer status report table and a range of the buffer data amount corresponding to the at least one extended buffer status report table have an inclusion relationship.

Technical solution 13. The terminal according to any one of Technical solutions 1-11, wherein a range of the buffer data amount corresponding to the buffer status report table and a range of the buffer data amount corresponding to the at least one extended buffer status report table have a succession relationship.

Technical solution 14. A buffer status report method of a terminal, the terminal comprising a buffer status report table and at least one extended buffer status report table, the method comprising:
selecting a table from the buffer status report table and the at least one extended buffer status report table;
obtaining an index from the table, according to a data amount in a buffer of the terminal; and
sending the index to the base station.

Technical solution 15. The method according to Technical solution 14, wherein the selecting a table comprises selecting the table according to the data amount in the buffer of the terminal; and
sending an indication signaling for indicating which table of the buffer status report table and the at least one extended buffer status report table corresponds to the index to a base station.

Technical solution 16. The method according to Technical solution 15, wherein the indication signaling is a Radio Resource Control signaling.

Technical solution 17. The method according to Technical solution 16, wherein the Radio Resource Control signaling is a RRC connection request signaling or a RRC connection setup complete signaling.

Technical solution 18. The method according to Technical solution 15, wherein the indication signaling is a Media Access Control signaling.

Technical solution 19. The method according to Technical solution 18, wherein a logic channel identifier in the Media Access Control signaling is used to indicate that which table of the buffer status report table and the at least one extended buffer status report table corresponds to the index.

Technical solution 20. The method according to Technical solution 18, wherein a logic channel identifier and at least certain bits in one additional byte in the Media Access Control signaling are used to indicate that which table of the buffer status report table and the at least one extended buffer status report table corresponds to the index.

Technical solution 21. The method according to Technical solution 18, wherein the last two bits of the LCID and a reversed bit in a sub-header in the Media Access Control signaling are used to indicate that which table of the buffer status report table and the at least one extended buffer status report table corresponds to the index.

Technical solution 22. The method according to Technical solution 14, wherein the selecting a table comprises selecting the table according to an indication signaling received from a base station.

Technical solution 23. The method according to Technical solution 22, wherein the indication signaling is a Radio Resource Control signaling.

Technical solution 24. The method according to Technical solution 23, wherein the Radio Resource Control signaling is a RRC connection setup signaling.

Technical solution 25. A base station, comprising:
a buffer status report table;
at least one extended buffer status report table;
a table selector, adapted to select a table from the buffer status report table and the at least one extended buffer status report table;
an index receiver, adapted to receive an index from a terminal; and
a data amount determining unit, adapted to determine the data amount in the buffer of the terminal according to the index from the table.

Technical solution 26. The base station according to Technical solution 25, wherein the table selector is adapted to select the table according to an indication signaling received form the terminal for indicating which table of the buffer status report table and the at least one extended buffer status report table corresponds to the index.

Technical solution 27. The base station according to Technical solution 26, wherein the table selector is adapted to receive a Radio Resource Control signaling.

Technical solution 28. The base station according to Technical solution 27, wherein the table selector is adapted to receive a RRC connection request signaling or a RRC connection setup complete signaling.

Technical solution 29. The base station according to Technical solution 27, wherein the table selector is adapted to receive a Media Access Control signaling.

Technical solution 30. The base station according to Technical solution 29, wherein the table selector is adapted to determine that which table of the buffer status report table and the at least one extended buffer status report table corresponds to the index according to a logic channel identifier in the Media Access Control signaling.

Technical solution 31. The base station according to Technical solution 29, wherein the table selector is adapted to determine that which table of the buffer status report table and the at least one extended buffer status report table corresponds to the index according to a logic channel identifier and at least certain bits in one additional byte in the Media Access Control signaling.

Technical solution 32. The base station according to Technical solution 29, wherein the table selector is adapted to determine that which table of the buffer status report table and the at least one extended buffer status report table corresponds to the index according to a bit in a logic channel identifier and a reversed bit in a sub-header in one additional byte in the Media Access Control signaling.

Technical solution 33. The base station according to Technical solution 25, wherein the table selector is adapted to send an indication signaling to a terminal for indicating which table of the buffer status report table and the at least one extended buffer status report table is to be used.

Technical solution 34. The base station according to Technical solution 33, wherein the table selector is adapted to send a Radio Resource Control signaling.

Technical solution 35. The base station according to Technical solution 34, wherein the table selector is adapted to send a RRC connection setup signaling.

Technical solution 36. The base station according to any one of Technical solutions 25-35, wherein a range of the buffer data amount corresponding to the buffer status report table and a range of the buffer data amount corresponding to the at least one extended buffer status report table have an inclusion relationship.

Technical solution 37. The base station according to any one of Technical solutions 25-35, wherein a range of the buffer data amount corresponding to the buffer status report table and a range of the buffer data amount corresponding to the at least one extended buffer status report table have a succession relationship.

Technical solution 38. A buffer status report obtaining method at a base station, the base station comprising a buffer status report table and at least one extended buffer status report table, the method comprising:
selecting a table from the buffer status report table and the at least one extended buffer status report table;
receiving an index from a terminal; and
determining the data amount in the buffer of the terminal according to the index from the table.

Technical solution 39. The method according to Technical solution 38, wherein the selecting a table comprises selecting the table according to an indication signaling received from a terminal for indicating which table of the buffer status report table and the at least one extended buffer status report table corresponds to the index.

Technical solution 40. The method according to Technical solution 39, wherein the indication signaling is a Radio Resource Control signaling.

Technical solution 41. The method according to Technical solution 40, wherein the Radio Resource Control signaling is a RRC connection request signaling or a RRC connection setup complete signaling.

Technical solution 42. The method according to Technical solution 39, wherein the indication signaling is a Media Access Control signaling.

Technical solution 43. The method according to Technical solution 42, wherein it is determined, according to a logic channel identifier in the Media Access Control signaling, that which table of the buffer status report table and the at least one extended buffer status report table corresponds to the index.

Technical solution 44. The method according to Technical solution 42, wherein it is determined, according to a logic channel identifier and at least certain bits in one additional byte in the Media Access Control signaling, that which table of the buffer status report table and the at least one extended buffer status report table corresponds to the index.

Technical solution 45. The method according to Technical solution 42, wherein it is determined, according to the bits of the LCD and a reversed bit in a sub-header in the Media Access Control signaling, that which table of the buffer status report table and the at least one extended buffer status report table corresponds to the index.

Technical solution 46. The method according to Technical solution 38, further comprising, before the receiving an index,
sending an indication signaling to a terminal for indicating which table of the buffer status report table and the at least one extended buffer status report table is to be used.

Technical solution 47. The method according to Technical solution 46, wherein the indication signaling is a Radio Resource Control signaling.

Technical solution 48. The method according to Technical solution 47, wherein the Radio Resource Control signaling is a RRC connection setup signaling.

Technical solution 49. A communication system, comprising a terminal according to any one of Technical solutions 1-13 and abase station according to any one of Technical solutions 25-37.

What is claimed is:

1. A terminal, comprising:
a buffer status report table;
at least another table for extended buffer status report;
a transmitter configured to select a table from among the buffer status report table and the at least another table for extended buffer status report, and transmit a Media Access Control (MAC) signaling to a base station, wherein a Logic Channel Identity (LCID) in the MAC signaling corresponds to a type of the selected buffer status report table;
and
an index sender sends the index to the base station an index obtained from the selected table according to an amount of data in a buffer of the terminal.

2. The terminal according to claim 1, wherein a range of the amount of data corresponding to the buffer status report table and a range of amount of data corresponding to the at least another table for extended buffer status report have an inclusion relationship.

3. The terminal according to claim 1, wherein a range of the amount of data corresponding to the buffer status report table and a range of the amount of data corresponding to the at least another table for extended buffer status report have a succession relationship.

4. A buffer status report method of a terminal, the terminal comprising a table for buffer status report and at least another table for extended buffer status report, the method comprising:
selecting a table from among the table for buffer status report and the at least another table for extended buffer status report;
transmitting a Media Access Control (MAC) signaling to a base station, wherein a Logic Channel Identity (LCID) in the MAC signaling corresponds to a type of the selected buffer status report table;
obtaining an index from the selected table, according to an amount of data in a buffer of the terminal; and
sending the index to the base station.

5. A base station, comprising:
a buffer status report table;
at least another table for extended buffer status report;
a receiver configured to look for a Logic Channel Identity (LCID) in a Media Access Control (MAC) signaling received from a terminal, wherein the LCID corresponds to a type of selected buffer status report table, and select a table from among the buffer status report table and the at least another table for extended buffer status report based on the LCID; and
an index receiver receives an index from the terminal and determines an amount of data in a buffer of the terminal according to the index received.

6. A buffer status report obtaining method at a base station, the base station comprising a table for buffer status report and at least another table for extended buffer status report, the method comprising:
looking for a Logic Channel Identity (LCID) in Media Access Control (MAC) signaling received from a terminal, wherein the LCID corresponds to a type of selected buffer status report table;
selecting a table from among the table for buffer status report and the at least another table for extended buffer status report based on the LCID;
receiving an index from the terminal; and
determining an amount of data in a buffer of the terminal according to the index from the selected table.

7. A terminal, comprising:
memory including a buffer status report table and at least another table for extended buffer status report; and
processing circuitry configured to:
select a table from among the buffer status report table and the at least another table for extended buffer status report;
cause a Media Access Control (MAC) signaling to be transmitted to a base station, wherein a Logic Channel Identity (LCID) in the MAC signaling corresponds to a type of the selected buffer status report table;
obtain an index from the selected table, according to an amount of data in a buffer of the terminal, and
cause the index to be sent to the base station.

8. The terminal according to claim 1, wherein, the MAC signaling further comprises at least certain bits of an additional byte, and the LCID and the at least certain bits of an additional byte together correspond to a type of the selected buffer status report table.

9. The terminal according to claim 1, wherein, the MAC signaling further comprises a preserved bit in a subhead of the MAC signaling, and the LCID and the preserved bit together correspond to a type of the selected buffer status report table.

* * * * *